Figure 1:
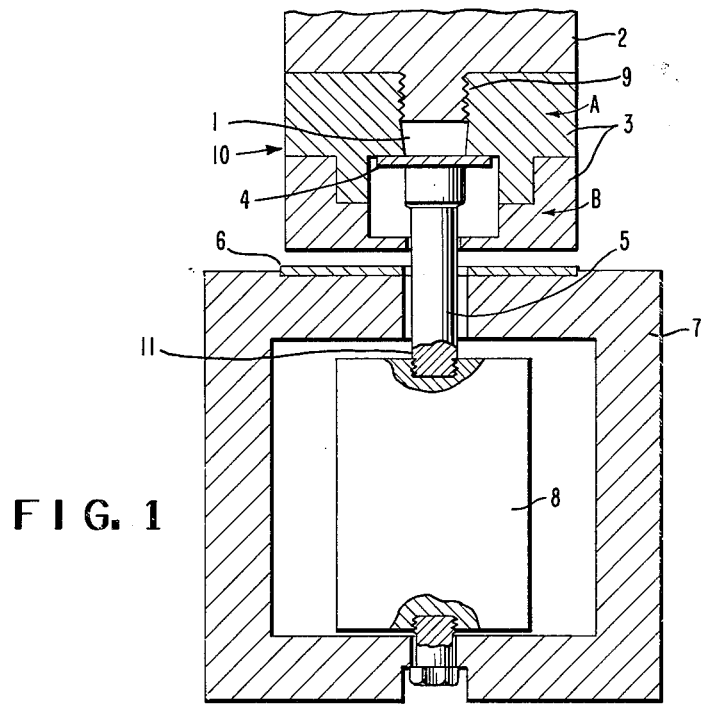

Oct. 26, 1965 W. E. SCHAEFER 3,213,680
LOAD CELL PROTECTOR
Filed March 15, 1963

INVENTOR
WILLIAM E. SCHAEFER

BY *John H. Tregoning*
ATTORNEY

United States Patent Office 3,213,680
Patented Oct. 26, 1965

3,213,680
LOAD CELL PROTECTOR
William E. Schaefer, Wilmington, Del., assignor to E. I. du Pont de Nemours and Company, Wilmington, Del., a corporation of Delaware
Filed Mar. 15, 1963, Ser. No. 265,543
5 Claims. (Cl. 73—141)

The present invention relates to a protector for a thrust or load measuring device. In particular, this invention relates to a novel load cell overload protector characterized by a shear device.

A load cell is a particular thrust or load measuring mechanism which is especially applicable to use in measuring the thrust of a rocket motor in static test firings. Located inside the load cell is a high-strength metal column to which is bonded four gages, electrically connected in the form of a Wheatstone bridge. In order to maintain accuracy of the bridge over a wide range of temperatures, temperature compensating resistors are added to the circuit. The principle of operation depends upon the distortion of the wire by a load or thrust, which creates a change in their resistance, thereby unbalancing the bridge circuit. As a result, the output voltage of the bridge varies proportionally with the load, and the change can be read on accompanying instruments, e.g., a voltmeter or galvanometer.

Load cells equipped with overload protectors are known in the art; however, there are serious disadvantages in the utilization of these known protectors. For example, in the case of the spring type load cell protector which has a spring attached to the bottom of the load cell, the oscillatory characteristics of the system as a result of the presence of the spring, have a significant deleterious effect on the measurement of the load. That is, a superimposed signal appears on the thrust curve as a result of the presence of the spring which makes it difficult to interpret the correct measurement. Another type of overload protector is constructed with flanges or external threads at the top of the load cell to which a mechanical stop can be attached. This type requires a critical set-up adjustment, that is, it involves the use of a mechanical stop which intercepts the load when the deflecting member of the load cell has been deflected to its safe limit of a few thousandths of an inch. Improper adjustments within this narrow range would result in loss of measurement data and/or damage to the load cell itself depending upon too small or too great an adjustment, respectively. The foregoing disadvantages produce unreliable data, and great expenses are encountered as a result of having to replace damaged equipment.

These and other disadvantages are overcome by the instant invention which provides a protector for a thrust measuring mechanism which comprises:

(1) a housing having two, a first and a second, opposed extremities and a central bore extending from one extremity to the other, said first extremity being provided with means for receiving a thrust producing device, (2) an elongated shaft movably mounted within said bore, said shaft extending through said second extremity and being connected to said thrust measuring mechanism, (3) rigidly mounted restraining means positioned in spaced relationship between said housing and said thrust measuring mechanism, and (4) shearing means for supporting the load produced on the housing by said thrust producing device and transmitting said load through said shaft to the thrust measuring mechanism, said shearing means traversing the bore in said housing and engaging said shaft, the shear strength of the shearing means being about equal to the load capacity of the thrust measuring mechanism, thereby causing the shearing means to fail and release said load on the thrust measuring mechanism before it is overloaded.

By the term "restraining means," as used herein, is meant any means, e.g., a rigid framework or a supporting assembly, etc., which can accept and support the weight and thrust of the thrust producing mechanism and the housing in a position separated from the thrust measuring mechanism. Absent this restraining means, with the shattering or shearing of the shearing means, the housing and the thrust producing mechanism would be forced upon the thrust measuring mechanism and destroy it.

The term "shearing means" is used broadly to define any design, e.g., a disc, a pin, a plate, etc., which is capable of shattering or shearing at a predetermined loading, however its physical configuration is not important. It functions also to support the housing and thrust-producing device and to prevent movement of the housing and thrust-producing device longitudinally along the shaft prior to shearing of the shearing means.

While the invention has rather broad application for use as a protector of any device or mechanism measuring thrust or determining weight, its preferred embodiment is a protector for a load cell and particularly where the load cell is being used to measure the thrust produced by a rocket motor.

Thus, the present invention is especially designed to provide a load cell protector which is capable of protecting load measuring devices under compression and can be altered to provide protection for load measuring devices under tension. In addition, a load cell protector is provided which does not cause any significant alterations in the oscillatory characteristics of the load cell system, thereby allowing accurate measurements of the loads, in that there are no springs or similar devices which result in added vibrations. Furthermore,, this invention provides a load cell protector which does not require a critical set-up adjustment and one which provides protection without damage to the load cell upon application of a force greater than the capacity of the load cell, i.e., the overload.

These and other advantages will become apparent as various embodiments of this invention are described in more detail in the accompanying drawings which are intended to be illustrative and are not to be regarded as limiting.

Figure 2:
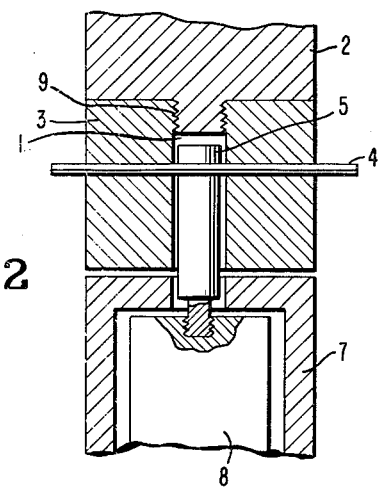
Figure 3:
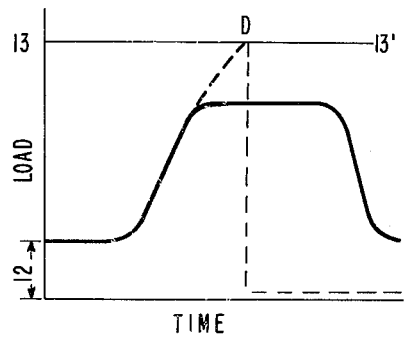

FIGURE 1 represents one embodiment of the invention, FIGURE 2 is an alternative embodiment and FIGURE 3 shows a plot of load vs. time in the static testing of a rocket motor.

FIGURE 1, which represents one preferred embodiment of the invention, illustrates a cross-sectional view of a load cell protector assembly which may be used in measuring the thrust of a rocket motor in a static test firing. In this figure, a rocket motor 2 is the thrust-producing device. A die A and guide B together constitute the guide assembly or housing 3, which has a bore 1 containing a shearing means 4 which can be of any configuration provided it has the desired shearing strength. In this instance, the shearing means 4 takes the form of a metal disc. A shaft or punch 5 is movably mounted in the bore 1. To restrain the housing 3 and the rocket motor when the shearing means 4 fails, a rigidly mounted frame 7 is provided which includes a shock absorber 6 such as for example, a lead wafer; however, the load cell protector can be utilized without the use of the shock absorber. The load cell 8 is securely mounted on the base of the frame 7 as shown. The rocket motor is, in this instance, secured to the housing at 9 and the housing 3, shearing means 4 and the motor 2 form as assembly contacting the load cell 8 through shaft 5 at point 11. This positioning is such as to support the motor and protector in a single stationary position.

Under normal loading conditions, the load to be measured, which is produced by the thrust-producing device 2, is transmitted to the load cell 8 through the disc 4 and punch 5. If the load exceeds the shear strength of the disc, which is selected at approximately the capacity of the load cell, the disc is sheared, the force is released from the load cell and transferred to the shock absorber 6 and frame 7 which constitute the mechanical stop or load arrestor.

In FIGURE 2, representing an alternative embodiment of the invention, the base of the load cell protector assembly, i.e., the shock absorber, the rigid frame, neither of which is shown here, and the load cell which is partially shown in cross-section, are the same as those of FIGURE 1. However, in this embodiment, the shaft is a metal rod 5, the shearing means is a shear pin 4 and the guide assembly or housing 3, moveable with respect to the metal rod 5 only upon application of an overload, is constructed as a single unit and may be equipped with holes of varying diameters to accommodate the shear pin 4 which may be of varying diameter and thus capable of withstanding different loads before shearing or shattering. To accommodate these pins 4 of varying diameter, the housing 3 may be provided with several holes of correspondingly varying diameter.

Upon initiation of the rocket motor 2, the force is transmitted to the load cell 8 through the guide assembly or housing 3, the shear pin 4, and metal rod 5. If the force exceeds the shear strength of the shear pin, which is selected at approximately the same capacity as that of the load cell, the pin fails, the force is released from the load cell and transferred to the shock absorber 6 and frame 7 which together constitute the mechanical stop or load arrestor.

In FIGURE 3, a plot of the load on the shearing means 4, i.e., weight or thrust, or weight plus thrust as the case may be, vs. time is given. To explain more fully and using FIGURE 1 for this purpose, a plot of the load put on the load cell through shaft 5 at point 11, which would include the sum of (a) the combined weight of the rocket motor and that portion of the load cell protector supported by the load cell, and (b) the thrust produced, in this instance, by the rocket motor 2. This is plotted over a given time period which in this instance represents the testing of a rocket motor in static test firings. The combined weight of the rocket motor and the supported portion of the load cell protector is represented by 12. The initial increase in the load represents the firing of the rocket motor. The increasing slope of the curve is a measure of the increasing of the rocket motor thrust until a uniform burning is reached. This uniform burning is represented by the flattening of the curve. The decline in the curve represents the completion of the burning and the reduction of thrust.

The continuation of the slope of the curve represented by dotted lines, depicts the situation where there has been a malfunction or some other difficulty which controls the performance of the rocket motor. The load then increases to a point, represented by line 13–13′, beyond which the load cell would be destroyed by the excess forces acting upon it however, since the shearing means 4 is designed to shear at this predetermined load, the force exerted on the load cell is never allowed to attain such magnitude, since the shearing means fails at this level and the force exerted through shaft 5 to the load cell 8 is eliminated. This shearing of the shearing means is represented by point D. As can be seen, the load is then reduced to virtually zero. Thus, the load cell is saved from destruction.

The foregoing discussion is applicable to a system under compression; however, the protector can also function for a system under tension by the addition of a yoke arrestor and, in the case of a shear disc, a rearrangement of the shear device.

The distance between the housing 3 and rigid frame 7, including shock absorber 6 if present, should be greater than the thickness of the shear device and less than the space between the shear device and rocket motor. The shock absorber is adapted to absorb some of the energy produced when the shear device is sheared by an overload and the guide assembly is brought to rest on the frame.

The shearing means 4 may be a shear disc or a pin, although its form is not important, e.g., a thread stripping device is applicable. The shearing means 4 must be constructed to have a shear strength approximately the same as the capacity of the load cell and must, therefore, be composed of materials such as metals, for example, brass, aluminum, copper and the like; plastic; ceramic; graphite, etc., which are capable of shearing or shattering at a predetermined load; however, the material used must not be so ductile that more than very minor deformation will occur prior to shattering.

The shock absorber is preferably constructed of lead and in wafer form; however, again design is not controlling but functionality is. Thus, materials capable of absorbing shock may be used.

The load cell itself is conventional and is equipped with conventional gages for measuring weight and thrust. The shear device is an essential part of the novel load cell protector. Although its form is not critical, a necessary criterion is that it must be of such shear strength that it shears at a predetermined load in order to prevent damage to the load cell. That is, the shear device must be so selected that its shear strength is approximately equal to the capacity of the load cell. Therefore any metal, plastic, ceramic, graphite, etc., can be used for this purpose. For example, Table I designates particular discs for specific load cell capacities and correspondingly Table II illustrates particular shear pins for specific load cell capacities:

*Table I*

| Disc Material | Load Cell working capacity, lb. | Load Cell safe capacity, lb. | Diameter of Disc, inch | Diameter of punch, inch | Thickness of Disc, inch | Shear Strength, lb. |
|---|---|---|---|---|---|---|
| Alclad 2024–T86 Aluminum | 1,000 | 1,500 | 1 3/16 | 0.566 | 0.0169 | 1,200 |
| Alclad 2024–T86 Aluminum | 2,000 | 3,000 | 1 3/16 | 0.566 | 0.0338 | 2,400 |

*Table II*

| Pin Material | Load Cell Working Capacity, lb. | Load Cell Safe Capacity, lb. | Diameter of Pin, inches | Shear Strength, lb. |
|---|---|---|---|---|
| Alclad 2024–T86 Aluminum | 1,000 | 1,500 | 0.138 | 1,200 |
| Alclad 2024–T86 Aluminum | 2,000 | 3,000 | 0.195 | 2,400 |

The above shear strength values may vary depending on the quality of the particular material used.

Shear strength is directly relate to material composition and can be obtained for specific materials in terms of pounds per square inch from the manufacturer or from any metals handbook. From the shear strength, the shearing area of the shearing means in the form of a disc can be calculated from the relationship $$A = \frac{L}{S}$$

in which A represents the area in square inches, L is the desired capacity in pounds at which the disc will shear, selected at a value less than the safe capacity of the load cell, and S is shear strength in pounds per square inch. Having calculated the area, the necessary disc thickness can be obtained from the following equation $$t = \frac{A}{\pi d}$$

in which $t$ is the thickness in inches, $d$ is the diameter of the punch in inches, and A is the area calculated from the foregoing relationship.

When the shearing means employed is a shear pin, the appropriate diameter which will shear at a capacity less than the safe capacity of the load cell is calculated. The total area, A, is calculated in the same manner as that of the shear disc, that is from the relationship $$A = \frac{L}{S}$$

However, since the pin is sheared in two places, the area of one sheared end of the pin would be $$\frac{A}{2}$$

Thus, the radius can be calculated from the definition $$A = \pi r^2 \therefore r = \sqrt{\frac{A}{\pi}}$$

and the diameter equals twice the radius, i.e., $$d = 2r$$

All parts of the load cell protector assembly except the shock absorber, can be composed of steel or any other metal of the proper strength characteristics, i.e., it should not be too brittle.

The invention has been described in detail; however, it will become apparent to those skilled in the art that many variations are possible without departing from the scope of the invention. Therefore, I intend to be limited only by the following claims.

I claim:

1. A protector for a thrust-measuring mechanism which comprises
   (1) a housing having two, a first and a second, opposed extremities and a central bore extending from one extremity to the other, said first extremity being provided with means for receiving a thrust-producing device,
   (2) an elongated shaft moveably mounted within said bore, said shaft extending through said second extremity and being connected to said thrust measuring mechanism,
   (3) rigidly mounted restraining means positioned in spaced relationship between said housing and said thrust-measuring mechanism, and
   (4) shearing means for supporting the load produced on the housing by said thrust producing device and transmitting said load through said shaft to the thrust measuring-mechanism, said shearing means traversing the bore in said housing and engaging said shaft, the shear strength of the shearing means being about equal to the load capacity of the thrust measuring-mechanism, thereby causing the shearing means to fail and release said load on the thrust measuring-mechanism before it is overloaded.

2. The protector of claim 1 wherein said shearing means is a disc.

3. The protector of claim 1 wherein said shearing means is a pin.

4. The protector of claim 1 wherein a shock absorber is positioned on said restraining means in line with said housing.

5. A protector for a load cell which comprises
   (1) a housing having two, a first and a second, opposed extremities and a central bore extending from one extremity to the other, said first extremity being provided with means for receiving a rocket motor,
   (2) an elongated shaft moveably mounted in said bore, said shaft extending through said second extremity and being connected to said load cell,
   (3) rigidly mounted restraining means positioned in spaced relationship between said housing and said load cell, and
   (4) shearing means for supporting the load produced on said housing by the rocket motor and transmitting said load through said shaft to the load cell, said shearing means traversing the bore in said housing and engaging said shaft, the shear strength of the shear means being about equal to the load capacity of the load cell, thereby causing the shearing means to fail and release said load on the load cell before it is overloaded, and the distance between said housing and the restraining means being greater than the thickness of the shearing means and less than the distance between the shearing means and the rocket motor.

References Cited by the Examiner

UNITED STATES PATENTS

| 181,453 | 8/76 | Le Blanc et al. | 10—23 X |
| 1,804,579 | 5/31 | Ward. | |
| 2,690,669 | 10/54 | Giladett | 73—116 |
| 2,953,019 | 9/60 | Rosenberg | 73—116 |

RICHARD C. QUEISSER, *Primary Examiner.*